(12) United States Patent
Clark

(10) Patent No.: US 8,621,125 B2
(45) Date of Patent: Dec. 31, 2013

(54) SYSTEM AND METHOD OF SENDING AND RECEIVING DATA AND COMMANDS USING THE TCK AND TMS OF IEEE 1149.1

(75) Inventor: Christopher J. Clark, Dover, NH (US)

(73) Assignee: Intellitech Corporation, Dover, NH (US)

(*) Notice: Subject to any disclaimer, the term of this patent is extended or adjusted under 35 U.S.C. 154(b) by 468 days.

(21) Appl. No.: 12/902,713

(22) Filed: Oct. 12, 2010

(65) Prior Publication Data

US 2011/0087813 A1   Apr. 14, 2011

Related U.S. Application Data

(60) Provisional application No. 61/251,019, filed on Oct. 13, 2009, provisional application No. 61/307,603, filed on Feb. 24, 2010.

(51) Int. Cl.
   *G06F 13/42* (2006.01)

(52) U.S. Cl.
   USPC ............................................... 710/105

(58) Field of Classification Search
   USPC ............................................... 710/105
   See application file for complete search history.

(56) References Cited

U.S. PATENT DOCUMENTS

| | | | | |
|---|---|---|---|---|
| 5,648,973 A | * | 7/1997 | Mote, Jr. | 714/727 |
| 5,677,915 A | * | 10/1997 | Whetsel | 714/726 |
| 5,805,609 A | * | 9/1998 | Mote, Jr. | 714/726 |
| 6,389,586 B1 | * | 5/2002 | McElvain | 716/111 |
| 7,216,275 B2 | * | 5/2007 | Liang | 714/727 |
| 7,814,386 B2 | * | 10/2010 | Seibold et al. | 714/733 |
| 2009/0113264 A1 | * | 4/2009 | Seibold et al. | 714/727 |

FOREIGN PATENT DOCUMENTS

EP    470770 A2 *   2/1992    ............. G06F 11/26

OTHER PUBLICATIONS

IEEE 1149.1 (JTAG) Boundary-Scan Testing for MAX II Devices, Oct. 2008.*

* cited by examiner

*Primary Examiner* — Paul R Myers

(57) ABSTRACT

A system and method that use the TCK and TMS to transmit address and data. IEEE 1149.1 based tools can use the system and method without modification to make IEEE 1149.1 TAPs appear and disappear, add compliance-enable circuits without pins and broadcast commands to IEEE P1687 instruments. The system and method use Test-Logic-Reset sequences with Run-Test-Idle to enable an on/off switch of various DFT capabilities. IEEE 1149.1 compliant TAP interfaces disappear to pass-through wires using the system and method. The sequences communicate an "address" which enables one or more of the TAP interfaces and a "command". The system and method has benefits for IEEE P1687 instrument chains and on-chip routing of the P1687 network.

3 Claims, 10 Drawing Sheets

SYSTEM AND METHOD OF SENDING AND RECEIVING DATA AND COMMANDS USING THE TCK AND TMS OF IEEE 1149.1

CROSS REFERENCE TO RELATED APPLICATIONS

This application claims benefit of U.S. Provisional Patent Application No. 61/251,019 filed Oct. 13, 2009, entitled PROTOCOL FOR REMOVING COMPLIANCE ENABLE PINS ON A TEST ACCESS PORT, and U.S. Provisional Patent Application No. 61/307,603 filed Feb. 24, 2010, entitled MAKING 1149.1 TAPS DISAPPEAR AND REAPPEAR IN SOCS AND 3D PACKAGES.

STATEMENT REGARDING FEDERALLY SPONSORED RESEARCH OR DEVELOPMENT

Not applicable

BACKGROUND OF THE INVENTION

The IEEE 1149.1 standard allows subordination of the Test Access Port (TAP) through additional pins called compliance-enable pins. This portion of the standard allows alternate IC test methods such as Level Sensitive Scan Design (LSSD) or muxed-scan IC test strategies to be used where the TAP operation may be temporarily switched off. The compliance-enable pins add one or more pins to the package that cannot be used for any other function. Compliance-enable pins can cause difficult to diagnose scan-path failures during board test when the TAP is thought to be operational but the compliance-enable pins are open or stuck-at due to a solder defect.

Compliance-enable pins have also been used by IC vendors to select a "main" TAP for the IC and "hide" the other TAPs when multiple TAP'd cores exist in the design. This presents a shorter scan path for emulation or hides details that an IC vendor may not want to provide. It also enables an IC with multiple TAPs to be IEEE 1149.1 compliant since the standard makes provision for only one TAP to be electrically visible in a single IC package. Daisy-chained IEEE 1149.1 TAPs in a System-on-Chip (SoC) requires extra test clocks to shift through the cores which can affect test and emulation performance Test data volume over IEEE 1149.1/JTAG continues to escalate especially for programming in-package FLASH in a 3D package. IEEE P1687 describes TAP operated on-chip instrumentation further increasing test data volume over the single full-duplex serial connection of IEEE 1149.1. Therefore, reducing the number of registers and Test Clocks (TCK) required can improve performance.

Methods have previously been described to deal with the limitations of the IEEE 1149.1 one bit BYPASS register and 32 bit DEVICE_ID register. The problem at the time was that Multi-Chip Modules (MCM) contain TAP'd die and a Boundary-Scan Description Language (BSDL) file for each device, but at the Printed Circuit Board (PCB) level the MCM must also present itself as a single IEEE 1149.1 compliant device with a single BSDL. The IEEE 1149.1 working group was presented with arguments for allowing these registers to be variable length, with the length defined by BSDL. This flexibility, which is allowed in any other IEEE 1149.1 register, was voted on but enough IEEE 1149.1 working group members at the time voted it down. Work has been done since then for Single Inline Packages (SiP). The approach uses an extra "STDI" input on each die and connecting all of the STDI together to the main package Test Data Input (TDI). This makes the SiP appear to have one TAP. However, this approach does not help much to shorten the scan-chain for multi-core devices. The number of loads on TDI and STDI may also limit performance. Another method has been described which requires a chip level TAP. This requires one core or die to be designed specifically for a multi-TAP package. Like previous approaches, it does not help with TAP management and reducing TCK cycles for each IR and Bypass register and it cannot be used to remove compliance-enable pins.

A TAP linking approach has also been previously described. The TAP linking approach can reduce the scan-chain TCK count in a coarse manner for each chain that is linked. It is limited as it requires a chip level or SiP package level die that has the TAP linker in it. It is a TAP itself so it cannot help with compliance-enable pins. It also introduces additional register data bits in the scan path which tools must account for. Most FPGA and CPU emulation tool software do not support these types of linking devices due to the complexity and lack of standardization of how they operate. The linker does not help remove compliance-enable pins. An "Addressable Shadow Protocol" has also been described which transmits data using TDI and TCK in the Run-Test/Idle (RTI) state. This does not work well for daisy-chains of cores with TAPs since TDI is not distributed to all of the targets, and it is not useful in removing compliance-enable pins. In addition, a method of using "fixed length" instruction registers to support multiple cores with TAPs has been described. This approach requires adding extra logic to keep the instruction width constant for the different TAPs. This appears to require significant software support and does not help with reducing compliance-enable pins.

IEEE 1149.7 describes something referred to as Zero Bit Scans. TAP0 through TAP7 modes are controlled by sequencing through the IEEE 1149.1 states of SELECT-DR, CAPTURE-DR, EXIT1-DR and then UPDATE-DR for each mode then entering the SHIFT-DR state to both lock the mode and to shift commands and data. Traversing from CAPTURE-DR to UPDATE-DR without going through SHIFT-DR is potentially hazardous as capture data then becomes update data. Because of this, IEEE 1149.7 requires that either the IDCODE or BYPASS be the loaded instructions prior to these sequences. The IEEE 1149.7 approach therefore has limitations as to what instruction is present and requires at least the TDI signal as well to shift in the command or data. IEEE 1149.7 requires direct access to the upper bits of the DEVICE_ID of an IEEE 1149.1 TAP in order to form a TAP address from those bits. This makes it difficult to use pre-built hard cores with 1149.7. It also becomes a problem in using multiple pre-designed 1149.1 compliant die in a 3D IC stack as there is no way to have addressable die via the star topology described by IEEE 1149.7. The IEEE 1149.7 also does not support enabling of compliance-enable of a TAP without a pin.

BRIEF SUMMARY OF THE INVENTION

In accordance with the present application, systems and methods of sending and receiving data and commands using the TCK and TMS of IEEE 1149.1 are disclosed. One aspect of the present application is to design a small gate count switch that could be signaled without the use of additional IC pins such as compliance-enable pins. Another aspect of the present application is to provide a method of addressing one IEEE 1149.1 TAP in an IC or 3D package containing multiple TAPs without shifting data in the SHIFT-DR state and without external pins. Another aspect of the present application is that logic could be placed externally to a standard IEEE 1149.1 TAP, monitoring TCK and TMS, so pre-designed hard cores with TAPs would not need to be modified to support the disclosed method. A further aspect of the present application is that the protocol is supportable by IEEE 1149.1 aware software even if the source code of the software was not available for modification. Emulation and FPGA vendors would not need to modify their software or hardware to support the method of sending data and commands using just the TCK and TMS. The present application discloses a logic circuit with a TCK and TMS input, at least one state machine for following the four states Test-Logic-Reset, Run-test/Idle, Select-Dr and Select IR and at least one counter which counts the number of traverses through Test-Logic-Reset.

In accordance with one aspect, electrical circuitry is provided that includes a TCK input, a TMS input, a state-machine, at least one state counter, at least one first logic circuit, and at least one second logic circuit. The TCK input is communicably coupleable to a TCK signal of a serial bus, and the TMS input is communicably coupleable to a TMS signal of the serial bus. The state-machine is operative to follow at least four states of a serial protocol, including a Test-Logic-Reset State, a Run-Test/IDLE state, a SELECT-DR state, and a SELECT-IR state. The state counter is operative to count the number of times the state-machine follows the serial protocol from the Test-Logic-Reset state through the Run-Test/IDLE state, the SELECT-DR state, the SELECT-IR state, and back to the Test-Logic-Reset state. The first logic circuit is operative to reset the state counter whenever the state-machine is in the SELECT-DR state, a logical-low is observed on the TMS input, and a logical-low to logical-high transition is observed on the TCK input. The second logic circuit is operative to reset the state counter whenever the state-machine is in the SELECT-IR state and a logical-low is observed on the TMS input and a logical-low to logical-high transition is observed on the TCK input. In accordance with one exemplary aspect, the serial bus and the serial protocol both conform to the IEEE 1149.1 standard.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

The disclosures of U.S. Provisional Patent Application No. 61/251,019 filed Oct. 13, 2009, entitled PROTOCOL FOR REMOVING COMPLIANCE ENABLE PINS ON A TEST ACCESS PORT, and U.S. Provisional Patent Application No. 61/307,603 filed Feb. 24, 2010, entitled MAKING 1149.1 TAPS DISAPPEAR AND REAPPEAR IN SOCS AND 3D PACKAGES are incorporated herein by reference in their entirety. The disclosure of standard IEEE Std. 1149.1-2001 is hereby incorporated herein by reference.

In accordance with the present application, systems and methods of sending and receiving data and commands using the TCK and TMS of IEEE 1149.1 are disclosed that employ an addressable on/off switch which monitors the TMS and TCK for a transmitted address and one or more transmitted commands delivered by a standard test bus master. The disclosed system uses four states of the IEEE 1149.1 state machine and un-common state machine transitions to create a signaling and data delivery protocol (also referred to herein as the "protocol"). The sequence of Test-Logic-Reset (TLR) to RTI to SELDR to SELIR to TLR is a seldom used state transition. If the TAP of an IC is in TLR, bus masters rarely need to enter test-logic-reset again after just traversing to it. An IEEE 1149.1 bus master that is already in the TLR state and instructed to move to the TLR state, remains in the TLR state and just clocks TCK one time. Typically they do not traverse this loop from TLR through RTI and back to TLR. Only when it is desired to go to TLR from RTI, SELDR or SELIR would this sequence be executed. This would happen only if issuing a TMS based reset of the test logic (holding TMS high and clocking TCK) from the RTI state. While TLR-RTI-SELDR-SELIR-TLR may be performed by bus masters when instructed to issue a TMS based reset, the sequence TLR-RTI-RTI-SELDR-SELIR-TLR is completely unique, with no currently known purpose. That is stopping in RTI for more than one TCK cycle. To guarantee this state is not accidently tripped, this embodiment of the protocol includes an opening transition through these states at least two times and at least one closing TLR-RTI-SELDR-SELIR-TLR loop which may include stopping in RTI for more than one TCK cycle.

Figure 1:
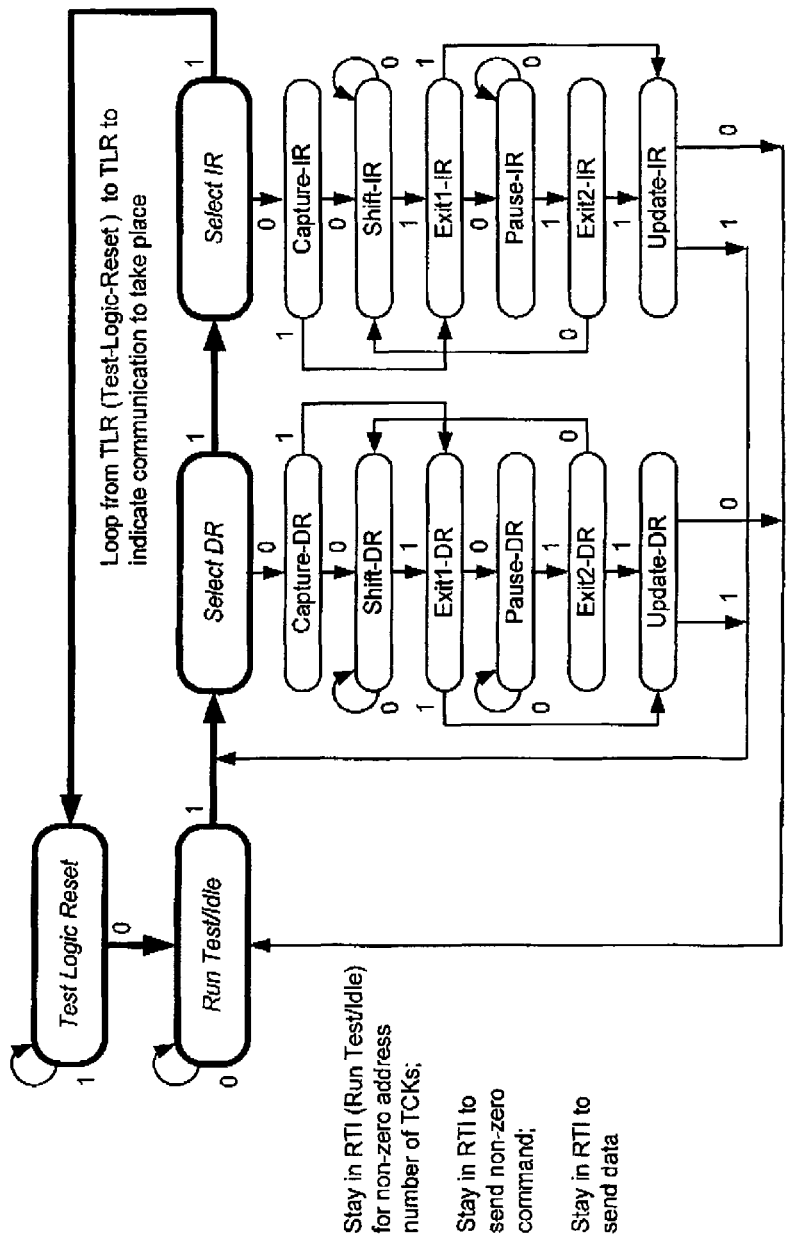
FIG. 1 is a diagram of an exemplary TLR-RTI-SELDR-SELIR-TLR sequence, according to an exemplary embodiment of the present application.

The signaling and data delivery protocol transmits addresses by using the four state loop two times (see FIG. 1). On the third time to RTI from TLR, the controller signals an address by staying in RTI for some number of TCK rising edges other than zero. The count of each TCK rising edge while in RTI represents the address value being transmitted. If the next rising edge of TCK has TMS at logic "1" while in RTI with zero TCKs received, then the protocol is discarded and ignored. This avoids false triggering by the receiving logic when a series of multiple Test-Logic-Resets are observed. To complete the transmit of the address via the TCK count in RTI; the controller completes the TLR-RTI-SELDR-SELIR loop two more times ending in TLR. On the first pass through TLR to RTI in that closing sequence, the command is transmitted, in the same manner as the address, by staying in RTI for more than one TCK cycle. One more sequence of TLR-RTI-SELDR-SELIR-TLR is used to transmit "data" values to the disclosed system if any exist. The protocol allows a data value to be sent on the final TLR-TLR sequence to go with a command. For instance, "Enable-On-Off, command with value one, takes a logic 1 to mean 'on' and a logic 0 to mean 'off'.

The sequence of IEEE 1149.1 states a bus master would have to traverse to communicate with a logic circuit for the disclosed system with an address of three is as follows:
To turn "on":

| | |
|---|---|
| 1) TLR-RTI-SELDR-SELIR | |
| 2) TLR-RTI-SELDR-SELIR | |
| 3) TLR-RTI-RTI-RTI-RTI-SELDR-SELIR | # send address 3 |
| 4) TLR-RTI-RTI-SELDR-SELIR | # send "Enable-on-off" (cmd=1) |
| 5) TLR-RTI-RTI-SELDR-SELIR-TLR | # send "1" for data for "on" |

To turn "off":

| | |
|---|---|
| 1) TLR-RTI-SELDR-SELIR | |
| 2) TLR-RTI-SELDR-SELIR | |
| 3) TLR-RTI-RTI-RTI-RTI-SELDR-SELIR | # send address 3 |
| 4) TLR-RTI-RTI-SELDR-SELIR | # send "Enable-on-off" (cmd=1) |
| 5) TLR-RTI-RTI-SELDR-SELIR-TLR | # send 0 for data |

Figure 2:
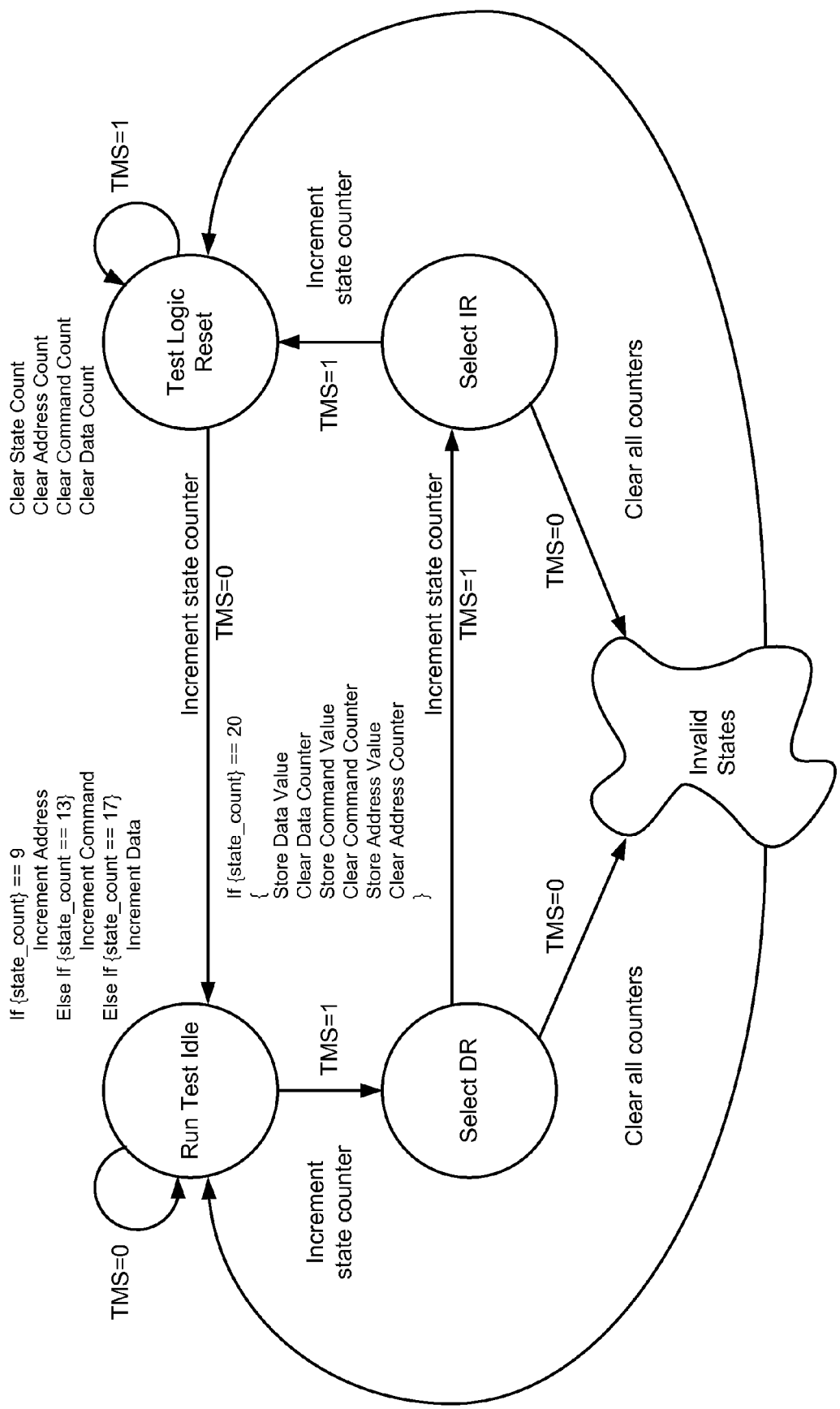
FIG. 2 is a diagram of an exemplary state machine for use in a system for sending and receiving data and commands using the TCK and TMS of IEEE 1149.1, according to an exemplary embodiment of the present application.

The following is an example list of addresses which is equivalent to the TCK cycle count in RTI on step 3
0=Disallowed
1=Broadcast address
2=Group address
3 . . . 128 unassigned addresses for use in multi-core designs
The following is an example Command list which is equivalent to the TCK cycle count in RTI on step 4
0=Disallowed
1=Enable-On-Off
2=TRST*-On-Off
3=Park in Pause-Dr
4="Follow me"
5=ShiftDR TCK Count The state machine for the disclosed system is shown in FIG. 2. A receiver logic circuit for the disclosed system can be implemented in fewer gates than an IEEE 1149.1 state machine as there are only four valid states. A basic logic block can be implemented in less than ten flip-flops and eighteen logic gates for basic capability. More logic is required for a larger address space or extra TLR-RTI-SELDR-SELIR-TLR loops are desired to support more commands or larger addresses without increasing the size of the RTI counter. Less TLR to TLR loops could also be implemented for simpler applications. The appendix lists the verilog source of an exemplary implementation of the disclosed system.

Test-Logic-Reset and Runbist

A collision with a normal test-logic-reset function is avoided by disallowing both the zero address and the zero valued command. On the $3^{rd}$ transition from TLR to RTI, if the bus master transitions to SEL-DR on the first rising TCK after entering RTI, that is staying in RTI for "0" TCK cycles, then the internal state machines are reset and no address or command is transmitted. Under those conditions, a standard Test-Logic-Reset sequence is assumed. Executing RUNBIST in the RTI state is not affected either. The RUNBIST instruction has to be loaded in order to use RUNBIST. Free-running TCK bus masters would not trigger the signaling and data delivery protocols either as staying in RTI for more than one TCK during the loop protocols, as a free running TCK bus master operates, would also reset the state machine. This does indicate that for free running TCK bus masters, which cannot control the state machine precisely between TLR and SELDR may have problems executing the disclosed method.

Broadcast Address for Compliance-Enable

The use of compliance-enable pins which enable the IEEE 1149.1 TAP to operate was discussed above. An example compliance-enable pin sets a 0 state to internal logic to subordinate the TAP and a 1 state to enable IEEE 1149.1 TAP compliance. By using the dedicated broadcast address, the traditional compliance-enable pins can be eliminated. Each pin can be removed and replaced with the small on-chip logic connected to TMS and TCK. Because the logic for the disclosed system is separate from the IEEE 1149.1 TAP, it can monitor the TCK and TMS lines to replace the compliance-enable pin.

Figure 3:
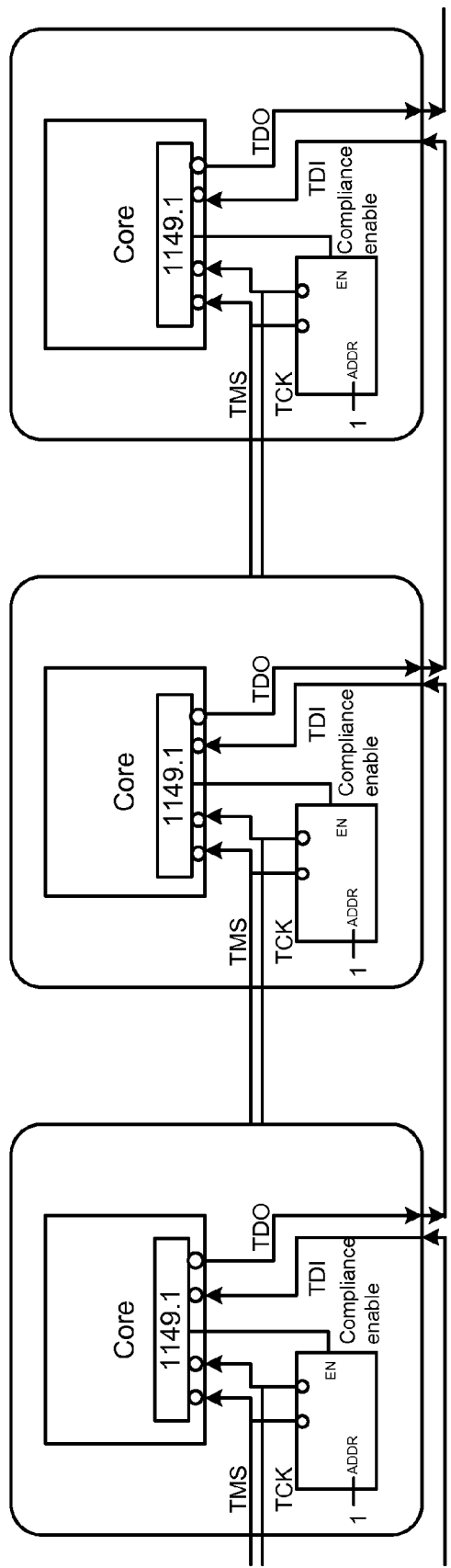
FIG. 3 is a block diagram of a daisy chain of ICs with on-chip compliance-enable.

FIG. 3 shows a daisy-chain of ICs using the on-chip broadcast address of "1". To set the internal compliance-enable of all devices in the chain to "on":

| | |
|---|---|
| 1) TLR-RTI-SELDR-SELIR | |
| 2) TLR-RTI-SELDR-SELIR | |
| 3) TLR-RTI-RTI-SELDR-SELIR | # send broadcast address 1 |
| 4) TLR-RTI-RTI-SELDR-SELIR | # send "on" (cmd=1) |
| 5) TLR-RTI-RTI-SELDR-SELIR-TLR | # send "1" for data |

Prior to IEEE 1149.1 based tests, the signaling and data delivery protocol can be driven by a bus master to configure all devices to enter compliance mode with that five step sequence. Since the sequence is very similar to just performing Test-Logic-Reset and stopping in RTI for an extra TCK, it is easy for available emulators and other IEEE 1149.1 based software to address TAPs without re-tooling or requiring end customers to buy an upgrade. JTAG tool support for the disclosed system does not need to be done at the source-code level. Any end-user of the disclosed system building a 3D package or multi-TAP core can address logic for the disclosed system with a non-aware JTAG emulator, JTAG test or FPGA programming tool using these TLR-RTI sequences.

Figure 4:
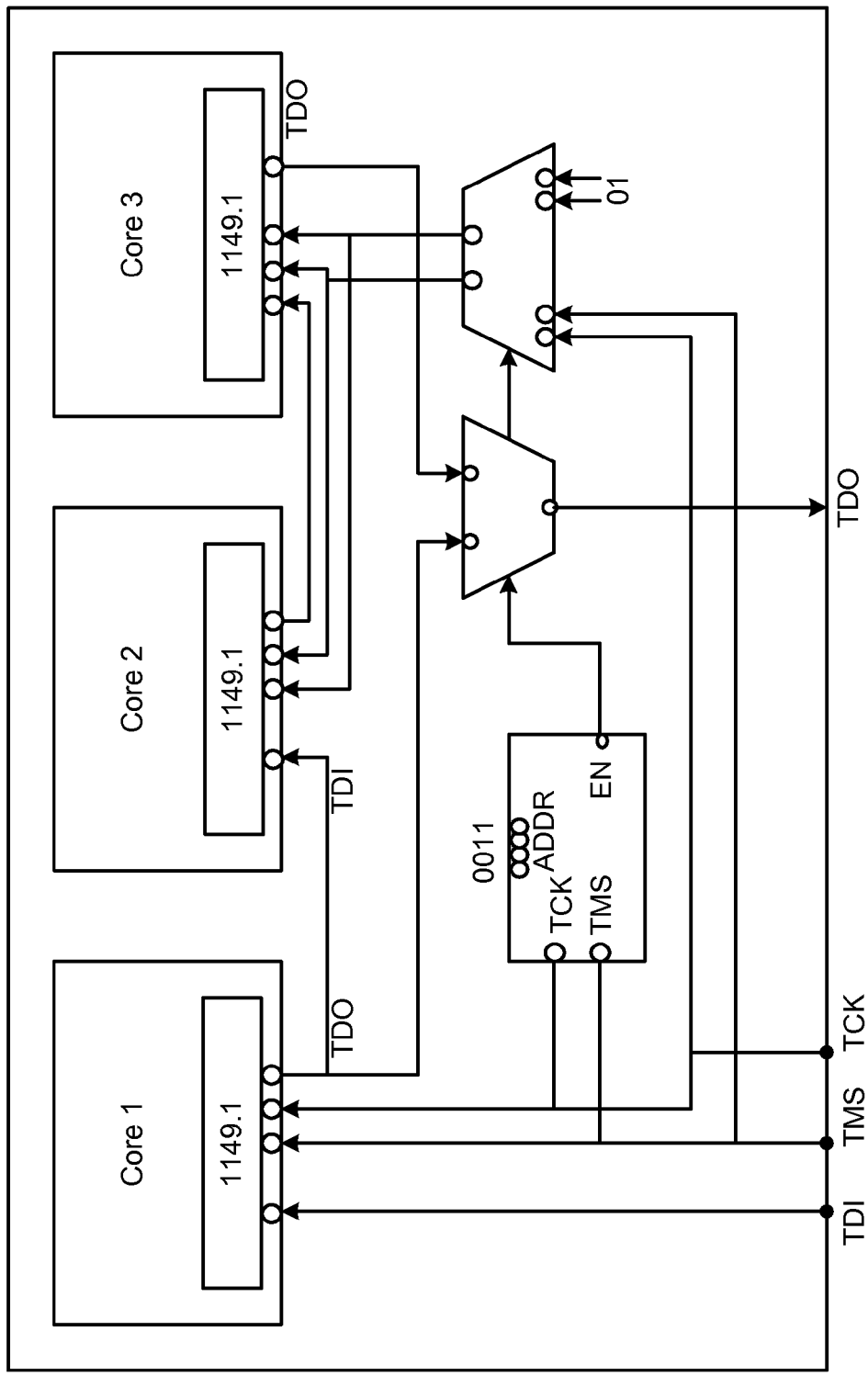
FIG. 4 is a block diagram of an exemplary singular use of the system of FIG. 2 with TAP'd cores in an IC, according to an exemplary embodiment of the present application.

Compliance-enable pins are not just for supporting IC test but also to hide multiple TAPs in a SoC design. In FIG. 4, the IEEE 1149.1 TAPs of Core 2 and 3 are hidden during normal operation with the disclosed system output "EN" in the "off" state. When the monitor for the disclosed system is signaled with the address of binary 0011 (3), the command "Enable-on-off" and a data value of logic '1', then it enables the scan-chain to include the TAP of both Core 2 and Core 3. When the monitor is "off" then the TMS and TCK are held constant to Core 2 and 3 and only Core 1 is present in the scan-chain. FIG. 4 shows a conceptual view, the multiplexer may be integrated with the IEEE 1149.1 tap in a more timing efficient manner.

Figure 5:
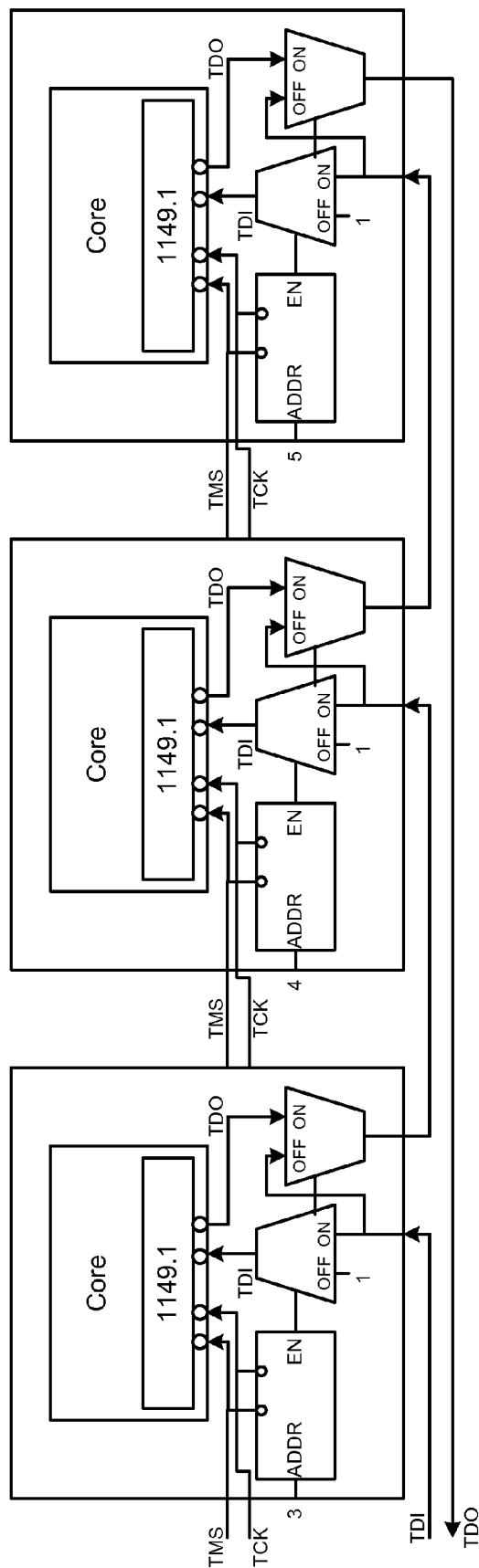
FIG. 5 is a block diagram of the system of FIG. 2 employed in a daisy chain of cores within an IC, according to an exemplary embodiment of the present application.

In FIG. 5 each core with a TAP that is assisted by the disclosed system is given a different address, 3 through 5, to add granularity on which cores present themselves in the scan chain. When "off" each core adds zero bits of IR or DR to the scan chain, essentially making them "disappear". TCK and TMS are driven to each core, but with the multiplexer in the "off" state, the TDI is a "1". This loads bypass into the cores preventing unwanted instructions from being loaded to the unused TAPs. The multiplexors show a conceptual block diagram, timing efficiencies may be obtained through integration.

Figure 6:
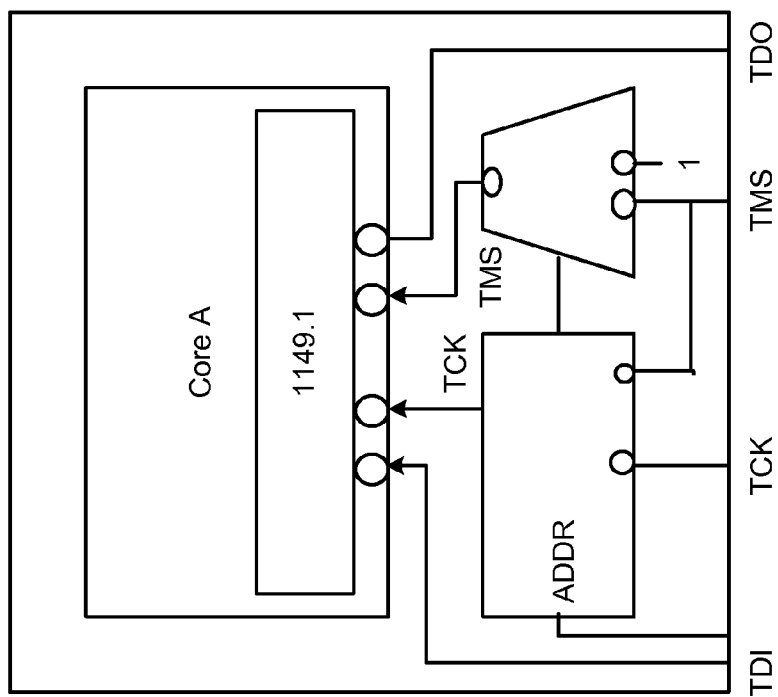
FIG. 6 is a block diagram of an exemplary mux configuration to support multi-drop serial test, according to an exemplary embodiment of the present application.

FIG. 6 shows how the disclosed system can be used to prepare a TAP'd core for multi-drop IEEE 1149.1 where TDI, TMS, TCK and Test Data Output (TDO) are common TMS and TCK are monitored as usual by the disclosed system but TCK passes through to the core. The mux provides a TMS of 1 when the TAP is not addressed keeping the Core in TLR and hence TDO in high impedance.

Figure 7:
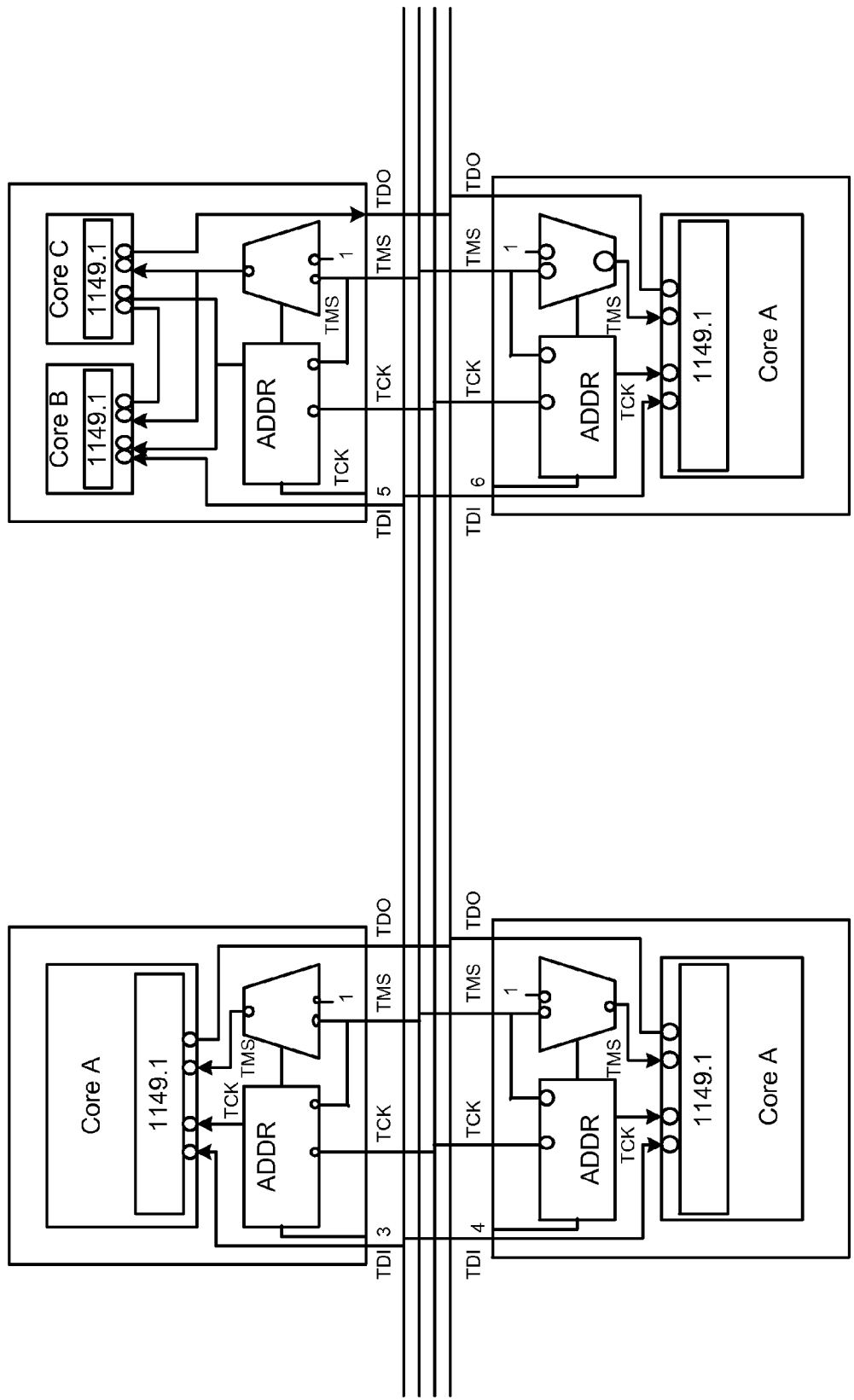
FIG. 7 is a block diagram of the system of FIG. 2 configured for stacked die, according to an exemplary embodiment of the present application.

This configuration is suitable for stacked die where each die would connect to each of the four TAP signals (see FIG. 7). Opens on the TAP signals of one die would not affect the access to other die, which clearly gives an advantage over the daisy-chain approach used for inter-core connections. The address is shown separately as "pins" but these could be shared functional pins with pull-ups/pull-downs latching the address at power-up and freeing the pins for functional behavior after that.

Another item in favor of the disclosed system is that standard languages for describing multi-drop/addressable IEEE 1149.1 TAPs exist and are in use by several IEEE 1149.1 tool providers. A Device Chain Description (DCD) file is shown below that describes the multi-drop of FIG. 7.

```
! Device Chain Description file
version 2;
multidrop_hub U1;
    type = protocol;
    address = 3;
    device Core1 core-a.bsdl      DIE ;
end multidrop_hub;
multidrop_hub U2;
    type = protocol;
    address = 4;
    device Core1 core-a.bsdl      DIE ;
end multidrop_hub;
multidrop_hub U3;
    type = protocol;
    address = 5;
    device Core1 core-b.bsdl      CORE;
    device Core2 core-c.bsdl      CORE;
end multidrop_hub;
multidrop_hub U4;
    type = protocol;
    address = 6;
    device Core1 core-a.bsdl      DIE ;
end multidrop_hub;
```

Note that the description supports both the address and supports having multiple cores called out per address with a description of the BSDL needed. Hierarchy is supported such that one can refer to U4.Core-A.Device_ID when setting or getting IEEE 1149.1 register values.

Advanced Capabilities

Those of ordinary skill in the art will appreciate that multi-drop IEEE 1149.1 presents some challenges for IC-to-IC interconnect testing since just one TDO is active at a time. The TLR sequence of the disclosed system may also appear to be problematic for holding the IC in EXTEST, however command "3" supports putting the multi-drop system in a parked PAUSE-DR state where it does not pass TCK to the core until a broadcasted command is received to follow the bus master. Group addressing provides some benefits in having more than one core enabled at a time but not all of them. This enables the application of test data to multiple cores concurrently during programming functions. Since TDO is disabled in a group address, only concurrent TDI data delivery can be achieved. By adding Concurrent JTAG, CJTAG, cores which are of the same type can be tested concurrently by transmitting Expected and Mask on the TRST and TDO during the SHIFT-DR state. The TDO is bidirectional in CJTAG to support this. A few more flip-flops and gates are needed for group addressing, park-pause and CJTAG concurrent test.

EXAMPLES

The P1687 working group is developing a standard for on-chip DFx structures accessible through an IEEE 1149.1 TAP. These DFx structures are called "instrumentation" by this working group. The structure of the standard will enable IP providers to write drivers for their instruments independent of the IC level scan-chains thus facilitating ease of re-use. The driver specification is written from an IEEE 1149.1 test data register perspective rather than 1s and 0s of tester languages like STIL. The entire instrument interface (for this version of the standard) write and read operations are performed through IEEE 1149.1 Test Data Registers (TDR). Since TDRs are used, it means that the derivative TAP signals Capture, Shift and Update, Reset and TCK must be distributed throughout the IC. P1687 presents some challenges for the DFT engineer and IC designer especially in multi-tapped core environments and 3D packages.

Figure 8:
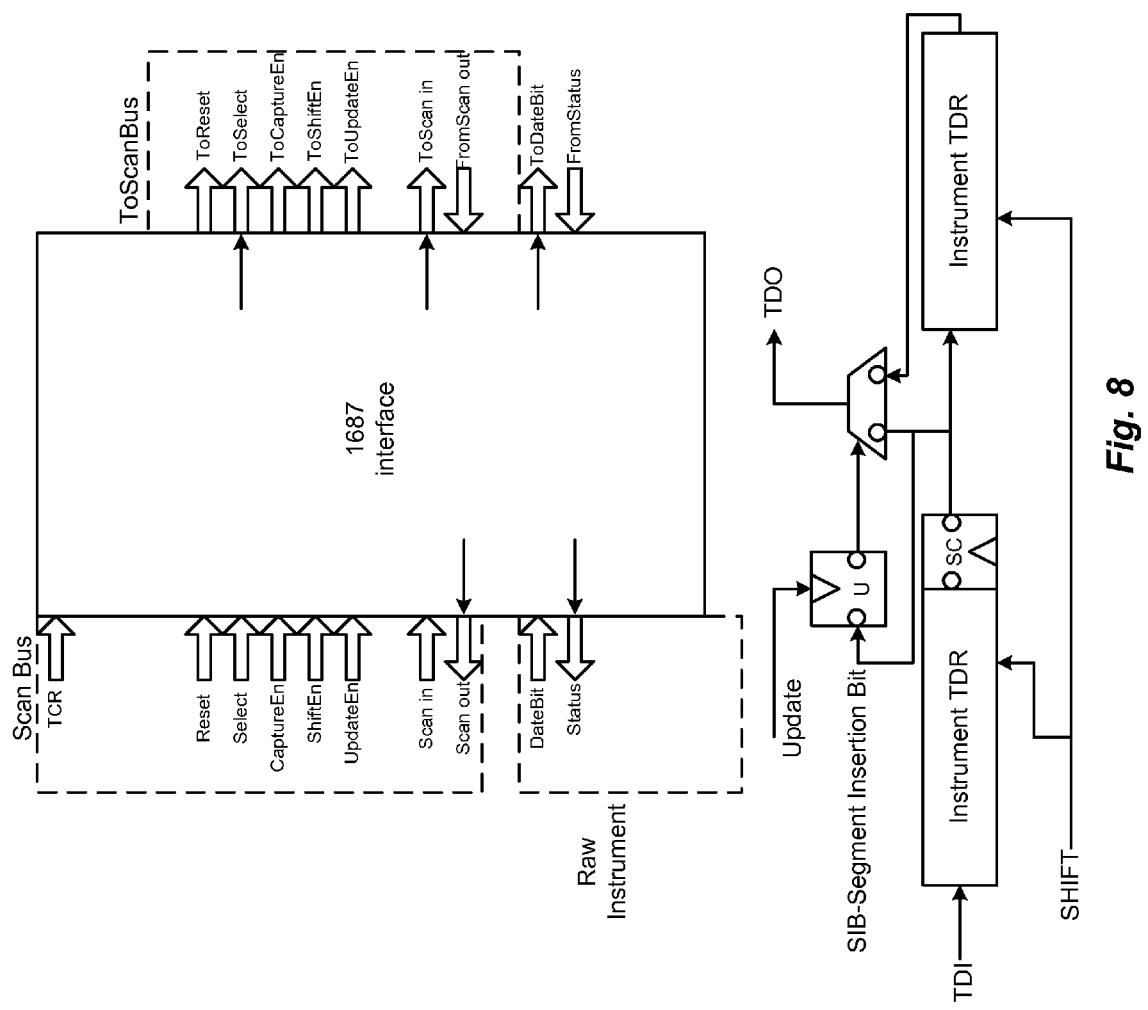
FIG. 8 is a diagram of a P1687 SIB and TDR interface.

An example P1687 architecture that has been proposed is the "Select Instrument Bit" or SIB (see FIG. 8). This acronym was recently changed to mean "Segment Insertion Bit". The SIB is a bit in the P1687 scan-chain or "P1687 network" in P1687 parlance. It is shown in FIG. 8 with an IEEE 1149.1 style scan-capture register, update register and mux. Segments of the internal instrument chains may then be included or muxed out by placing the appropriate bit in the SIB register.

Figure 9:
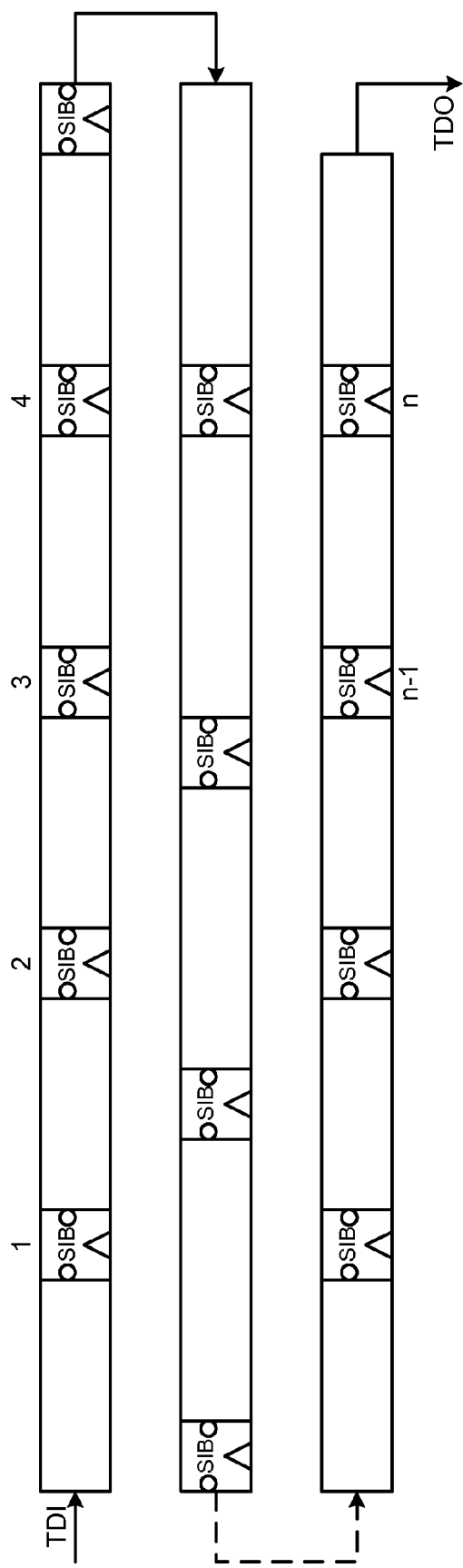
FIG. 9 is a diagram depicting many scans needed to expand a P1687 network.

Since the UPDATE-DR state must be traversed to add a segment, the SIB prevents the P1687 network from being expanded in one SHIFT operation. With "n" SIBs in a single chain, it will take "n" shift operations on an expanding chain to have access to the last instrument in the chain (see FIG. 9). If the SC register is to be reset to a collapsed state, when entering TLR, the process of expanding all the SIBs again would be needed. There is a proposal to look at how to handle "local resets" to avoid this. A separate standard IEEE 1149.1 TDR register which is comprised of just the SC control bits is now allowed in the proposed standard.

Figure 10:
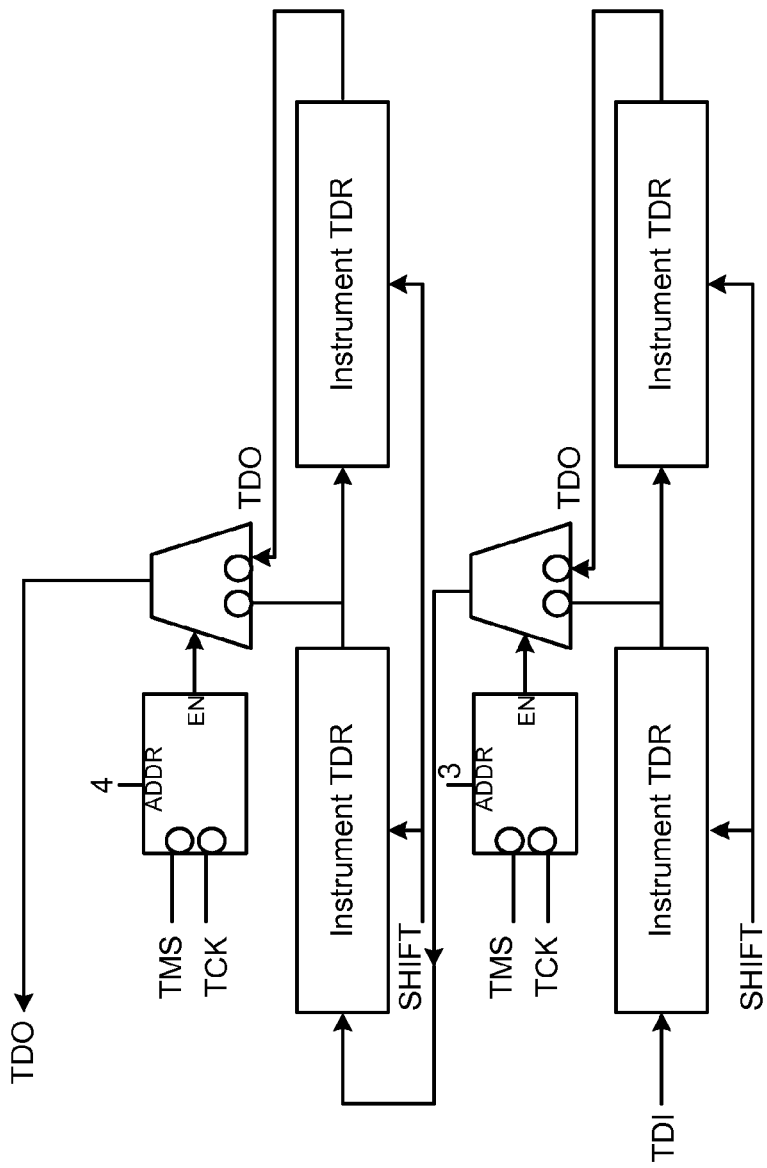
FIG. 10 is a block diagram of the system of FIG. 2 employed with P1687, according to an exemplary embodiment of the present application.

Distributing four IEEE 1149.1 TAP decoded signals and buffering TCK throughout the IC requires significant routing and static timing analysis on the signals to avoid skew build-up and shrinking the available setup/hold window for the scanIn and scanOut. A better approach for some implementations would be to distribute TCK/TMS internally in the core, IC or even across die boundaries. Two signals instead of five could be used with "monitors" available to provide local decoded TAP signals. A monitor for the disclosed system could take the place of a SIB, at slightly higher cost in gates and logic. The monitors could insert scan segments as each one is addressed or as a group all at once (see FIG. 10) using broadcast. The sequence to communicate to all of the monitors of the disclosed system would be only a few TCK cycles compared to shifting through an entire P1687 network. With group or broadcast addressing, all segments could be turned on at once without shifting the scan-chain at all. This could reduce the number of TCK cycles necessary for testing the SoC and accessing the instruments.

CONCLUSIONS

A protocol for removing compliance-enable pins on an IEEE 1149.1 TAP is shown. This was expanded to enable selection and "hiding" of IEEE 1149.1 TAPS in series scan-chains to reduce TCK cycles needed to access multi-TAP cores. The disclosed system was shown with modifications to support multi-drop topologies for stacked die. The approach only uses TLR-RTI-SELECTDR-SELECTIR-TLR sequences enabling existing software and hardware IEEE 1149.1 controllers to be used with multi-TAP designs. The logic is small and can be added to existing hard cores without modifying the IEEE 1149.1 TAP, Instruction Register, Device ID or other Test Data registers. Software tools and JTAG controllers do not need to be modified to support it and it has additional desirable attributes such as broadcast and group addressing, with Concurrent JTAG and P1687 compatibility.

The present application leverages past IEEE 1149.1 multi-drop architectures for use in multi-TAP SoCs and multi-die 3D SiPs to assist in die-to-die interconnect tests and test scheduling of on-die instruments. The disclosed system preserves concurrent test architectures which simplify the complexity of concurrent (gang) on-wafer or multi-die package test.

Exemplary use of the disclosed system on the internal P1687 network was shown to have some benefits for P1687 instruments access.

The protocols shown include two TLR-RTI-SELECTDR-SELECTIR-TLR loop sequences with the command and data transmitted on the closing loops. It is noted that more sequences can be used, 3 loops, 4 loops, 5 loops, etc., to add more capabilities and modes limited only by the amount of logic used. These loops would allow more capabilities and features to be transmitted by the protocol. It can also be noted that less TLR-RTI-SELECTDR-SELECTIR-TLR loops could be used with the trade-off of potentially more susceptibility to having the protocol be falsely triggered by an intended TLR.

The IEEE 1149.1 standard is described in the IEEE 1149.1-2001 Standard Test Access Port and Boundary Scan Architecture Specification, the entire disclosure of which is incorporated herein by reference.

It will be appreciated by those of ordinary skill in the art that modifications to and variations of the above-described systems and methods may be made without departing from the inventive concepts disclosed herein. Accordingly, this disclosure should not be viewed as limited except as by the scope and spirit of the appended claims.

APPENDIX

```
module protocol ( POR, TCK, TRSTN, TMS, MY_ADDR, CMD1_EN_OUT,
    CMD2_EN_OUT, CMD3_DATA_OUT, CMD4_DATA_OUT, CMD5_EN_OUT );
input       POR, TCK, TMS,
            TRSTN; // TRSTN is optional
input   [15:0] MY_ADDR;
output      CMD1_EN_OUT, CMD2_EN_OUT, CMD5_EN_OUT;
output  [ 7:0] CMD3_DATA_OUT, CMD4_DATA_OUT;
parameter ADDR_WIDTH = 3;
parameter CMD_WIDTH = 3;
parameter DATA_WIDTH = 4;
reg     [ 4:0] stateCount;
reg     [15:0] addrCount;
reg     [ 2:0] cmdCount;
reg     [ 3:0] dataCount;
reg     [ 3:0] FSM_State;
reg         CMD1_EN_OUT, CMD2_EN_OUT, CMD5_EN_OUT;
reg     [ 7:0] CMD3_DATA_OUT, CMD4_DATA_OUT;
parameter [ 3:0] Test_Logic_Reset   = 4'h0,
                 Run_Test_Idle      = 4'h1,
                 Select_DR_Scan     = 4'h2,
                 Select_IR_Scan     = 4'h3,
                 Capture            = 4'h4,
                 Shift              = 4'h5,
                 Exit1              = 4'h6,
                 Pause              = 4'h7,
                 Exit2              = 4'h8,
                 Update             = 4'h9;
parameter [2:0] CMD1 = 3'd1;
parameter [2:0] CMD2 = 3'd2;
parameter [2:0] CMD3 = 3'd3;
parameter [2:0] CMD4 = 3'd4;
parameter [2:0] CMD5 = 3'd5;
parameter [4:0] ADDR_COUNT   = 4 * 2 /*loops*/ + 1;
parameter [4:0] CMD_COUNT    = 4 * 3 /*loops*/ + 1;
parameter [4:0] DATA_COUNT   = 4 * 4 /*loops*/ + 1;
parameter [4:0] LOCK_COUNT   = 4 * 4 /*loops*/ + 3;
wire RESET_L = TRSTN & POR;
always @(posedge TCK or negedge RESET_L)
begin
if (!RESET_L)
    begin
    FSM_State       <= Test_Logic_Reset;
    stateCount      <= 5'd0;
    addrCount       <= 16'h0;
    cmdCount        <= 3'd0;
    dataCount       <= 4'h0;
    CMD1_EN_OUT     <= 1'b0;
    CMD2_EN_OUT     <= 1'b0;
    CMD3_DATA_OUT   <= 8'h00;
    CMD4_DATA_OUT   <= 8'hFF;
    CMD5_EN_OUT     <= 1'b0;
    end
else
```

APPENDIX-continued

```
case (FSM_State)
    Test_Logic_Reset:
    begin
        case (TMS)
        // Go to RTI
        0: begin
            FSM_State <= Run_Test_Idle;
            stateCount <= (stateCount[1:0]==2'b00) ? stateCount+1    : 5'd0;
            addrCount  <= (stateCount[1:0]==2'b00) ? addrCount       : 16'h0;
            cmdCount   <= (stateCount[1:0]==2'b00) ? cmdCount        : 3'd0;
            dataCount  <= (stateCount[1:0]==2'b00) ? dataCount       : 4'h0;
            end
        // Loop in TLR
        1: FSM_State <= Test_Logic_Reset;
        endcase
    end
    Run_Test_Idle:
        case (TMS)
        // Loop in RTI
        0: begin
            FSM_State <= Run_Test_Idle;
            case (stateCount)
            ADDR_COUNT: addrCount <= addrCount+1;
            CMD_COUNT : cmdCount  <= cmdCount +1;
            DATA_COUNT: dataCount <= dataCount+1;
            default      : begin
                              stateCount <= 5'd0;
                              addrCount  <= 16'h0;
                              cmdCount   <= 3'd0;
                              dataCount  <= 4'h0;
                              end
            endcase
            end
        // Go to Select_DR_Scan
        1: begin
            FSM_State <= Select_DR_Scan;
            stateCount <= (stateCount[1:0]==2'b01) ? stateCount+1    : 5'd0;
            addrCount  <= (stateCount[1:0]==2'b01) ? addrCount       : 16'h0;
            cmdCount   <= (stateCount[1:0]==2'b01) ? cmdCount        : 3'd0;
            dataCount  <= (stateCount[1:0]==2'b01) ? dataCount       : 4'h0;
            end
        endcase
    Select_DR_Scan:
        case (TMS)
        // Go to Capture_DR
        0: begin
            FSM_State <= Capture;
            stateCount <= 5'd0;
            addrCount  <= 16'h0;
            cmdCount   <= 3'd0;
            dataCount  <= 4'h0;
            end
        // Go to Select_IR_Scan
        1: begin
            FSM_State <= Select_IR_Scan;
            stateCount <= (stateCount[1:0]==2'b10) ? stateCount+1    : 5'd0;
            addrCount  <= (stateCount[1:0]==2'b10) ? addrCount       : 16'h0;
            cmdCount   <= (stateCount[1:0]==2'b10) ? cmdCount        : 3'd0;
            dataCount  <= (stateCount[1:0]==2'b10) ? dataCount       : 4'h0;
            end
        endcase
    Capture:   FSM_State <= TMS ? Exit1           : Shift;
    Shift:     FSM_State <= TMS ? Exit1           : Shift;
    Exit1:     FSM_State <= TMS ? Update          : Pause;
    Pause:     FSM_State <= TMS ? Exit2           : Pause;
    Exit2:     FSM_State <= TMS ? Update          : Shift;
    Update:    FSM_State <= TMS ? Select_DR_Scan  : Run_Test_Idle;
    Select_IR_Scan:
        case (TMS)
        // Go to Capture
        0: begin
            FSM_State <= Capture;
            stateCount <= 5'd0;
            addrCount  <= 16'h0;
            cmdCount   <= 3'd0;
            dataCount  <= 4'h0;
            end
        // Go To Test_Logic_Reset
        1: begin
            FSM_State <= Test_Logic_Reset;
```

APPENDIX-continued

```
                    case (stateCount)
                    LOCK_COUNT:
                        begin
                            stateCount <= 5'd0;
                            addrCount <= 16'h0;
                            cmdCount <= 3'd0;
                            dataCount <= 4'h0;
                            if (addrCount == MY_ADDR)
                                case (cmdCount)
                                    CMD1: CMD1_EN_OUT <= dataCount[0];
                                    CMD2: CMD2_EN_OUT <= dataCount[0];
                                    CMD3:
                                        case (dataCount)
                                            4'h0    : CMD3_DATA_OUT <= 8'h00;
                                            4'h1    : CMD3_DATA_OUT <= 8'h01;
                                            4'h2    : CMD3_DATA_OUT <= 8'h02;
                                            4'h3    : CMD3_DATA_OUT <= 8'h04;
                                            4'h4    : CMD3_DATA_OUT <= 8'h08;
                                            4'h5    : CMD3_DATA_OUT <= 8'h10;
                                            4'h6    : CMD3_DATA_OUT <= 8'h20;
                                            4'h7    : CMD3_DATA_OUT <= 8'h40;
                                            4'h8    : CMD3_DATA_OUT <= 8'h80;
                                            default: CMD3_DATA_OUT <= CMD3_DATA_OUT;
                                        endcase
                                    CMD4:
                                        case (dataCount)
                                            4'h0    : CMD4_DATA_OUT      <= 8'hFF;
                                            4'h1    : CMD4_DATA_OUT[0]   <= ~CMD4_DATA_OUT[0];
                                            4'h2    : CMD4_DATA_OUT[1]   <= ~CMD4_DATA_OUT[1];
                                            4'h3    : CMD4_DATA_OUT[2]   <= ~CMD4_DATA_OUT[2];
                                            4'h4    : CMD4_DATA_OUT[3]   <= ~CMD4_DATA_OUT[3];
                                            4'h5    : CMD4_DATA_OUT[4]   <= ~CMD4_DATA_OUT[4];
                                            4'h6    : CMD4_DATA_OUT[5]   <= ~CMD4_DATA_OUT[5];
                                            4'h7    : CMD4_DATA_OUT[6]   <= ~CMD4_DATA_OUT[6];
                                            4'h8    : CMD4_DATA_OUT[7]   <= ~CMD4_DATA_OUT[7];
                                            default: CMD4_DATA_OUT       <= CMD4_DATA_OUT;
                                        endcase
                                    CMD5: CMD5_EN_OUT <= dataCount[0];
                                    default:
                                        begin
                                        end
                                endcase
                        end
                    default :
                        begin
                            stateCount <= (stateCount[1:0]==2'b11) ? stateCount+1 : 5'd0;
                            addrCount <= (stateCount[1:0]==2'b11) ? addrCount : 16'h0;
                            cmdCount <= (stateCount[1:0]==2'b11) ? cmdCount : 3'd0;
                            dataCount <= (stateCount[1:0]==2'b11) ? dataCount : 4'h0;
                        end
                    endcase
                end
            endcase
        default: begin
                    FSM_State <= Test_Logic_Reset;
                    stateCount <= 5'd0;
                    addrCount <= 16'h0;
                    cmdCount <= 3'd0;
                    dataCount <= 4'h0;
                end
        endcase
    end
endmodule
```

What is claimed is:

1. Electrical circuitry, comprising:

a TCK input communicably coupleable to a TCK signal of a serial bus;

a TMS input communicably coupleable to a TMS signal of the serial bus;

a state-machine operative to follow at least four states of a serial protocol, the four states including a Test-Logic-Reset State, a Run-Test/IDLE state, a SELECT-DR state, and a SELECT-IR state;

at least one state counter operative to count a number of times the state-machine follows the serial protocol from the Test-Logic-Reset state through the Run-Test/IDLE state, the SELECT-DR state, the SELECT-IR state, and back to the Test-Logic-Reset state;

at least one first logic circuit operative to reset the state counter whenever the state-machine is in the SELECT-DR state, a logical-low is observed on the TMS input, and a logical-low to logical-high transition is observed on the TCK input; and at least one second logic circuit operative to reset the state counter whenever the state-machine is in the SELECT-IR state and a logical-low is observed on the TMS input and a logical-low to logical-high transition is observed on the TCK input.

2. A method of transmitting data other than 1149.1 state information, to an electronic circuit using just the TCK and TMS signals of IEEE Std. 1149.1-2001 and the four IEEE 1149.1 states of Test-Logic-Reset, Runtest/IDLE, SELECT-DR and SELECT-IR.

3. A method of receiving data other than 1149.1 state information, by counting an IEEE 1149.1 state machine's transitions through the 1149.1 states of Test-Logic-Reset, Runtest/IDLE, SELECT-DR, SELECT-IR and back to Test-Logic-Reset.

* * * * *